United States Patent [19]
Burghart et al.

[11] Patent Number: 5,396,620
[45] Date of Patent: Mar. 7, 1995

[54] METHOD FOR WRITING SPECIFIC VALUES LAST INTO DATA STORAGE GROUPS CONTAINING REDUNDANCY

[75] Inventors: Mitchell E. Burghart; John T. O'Brien, both of Louisville, Colo.

[73] Assignee: Storage Technology Corporation, Louisville, Colo.

[21] Appl. No.: 171,113

[22] Filed: Dec. 21, 1993

[51] Int. Cl.6 .............................................. G06F 11/00
[52] U.S. Cl. .................................... 395/575; 371/10.1
[58] Field of Search ............. 395/575; 371/10.1, 10.3, 371/10.2, 40.4, 40.1

[56] References Cited

U.S. PATENT DOCUMENTS

| | | | |
|---|---|---|---|
| 4,761,785 | 8/1988 | Clark et al. | 371/51 |
| 5,124,987 | 6/1992 | Milligan et al. | 371/10.1 |
| 5,195,100 | 3/1993 | Katz et al. | 371/66 |
| 5,235,601 | 8/1993 | Stallmo et al. | 371/40.1 |
| 5,274,799 | 12/1993 | Brant et al. | 395/575 |
| 5,278,838 | 1/1994 | Ng et al. | 371/10.1 |
| 5,289,478 | 2/1994 | Barlow et al. | 371/40.1 |
| 5,305,326 | 4/1994 | Solomon et al. | 371/11.1 |
| 5,313,626 | 5/1994 | Jones et al. | 395/575 |
| 5,315,602 | 5/1994 | Noya et al. | 371/40.4 |

*Primary Examiner*—Vincent P. Canney
*Assistant Examiner*—Joseph E. Palys
*Attorney, Agent, or Firm*—Duft, Graziano & Forest

[57] ABSTRACT

The present invention comprises a method for enhancing data integrity during write operations in a data storage subsystem which comprises an array of redundant, interconnected disk drives. A data storage subsystem is disclosed which provides for writing data segments spread across N disk drives of the array and provides for generating and recording redundancy information spread across M disk drives. Redundancy information is used for reconstructing erroneous data in the case of a disk drive failure. It may be desirable to write a final portion of the data last, after other portions of the data and associated redundancy information have been recorded to the disk drives. The last portion of the data segments may contain information that validates the data. It is common to automatically generate the redundancy information as the data is written to the disk drives. The generated redundancy information is then later written to the disk drives. This presents a problem in that the last portion of the data is written to disks before correct redundancy information is written. The present invention discloses a method of writing data and associated redundancy information to eliminate this problem. A first portion of the data excluding the validation portion is written to disks as the redundancy information is accumulated. Next, the last portion is applied to the redundancy accumulator circuitry but is not yet written to the disks. The redundancy information of the data is now recorded to the disks. Finally, the last portion of the data is recorded to the disks. This method eliminates the period of time in which apparently valid data segments on disks are actually invalid because the associated redundancy information is not yet written to disk.

13 Claims, 5 Drawing Sheets

METHOD FOR WRITING SPECIFIC VALUES LAST INTO DATA STORAGE GROUPS CONTAINING REDUNDANCY

BACKGROUND OF THE INVENTION

1. Field of the Invention

This invention relates to data storage subsystems and, in particular, to an improved process for assuring data integrity when writing data to storage subsystems that use redundancy information.

2. Related Art

The method of the present invention may be advantageously used in conjunction with the methods and apparatus of the data storage subsystem disclosed in U.S. Pat. No. 5,124,987 issued to Charles A. Milligan, et al. Milligan, et al., discloses a data storage subsystem that utilizes an array of parallel disk drives to improve performance and reliability of the data storage subsystem. Data is generated external to a cache component of the data storage subsystem and applied to the cache component. Redundancy information is automatically generated by the cache component. The cache component controllably writes the externally generated data and internally generated redundancy information to a plurality of disk drives in the array. The redundancy information is used by the storage subsystem control unit to recover lost information in case of a failure of a limited number of the disks in the array of disk drives. Milligan, et al., discloses a method for improving the performance of such a storage subsystem by reducing the number of read and write operations required to update the stored redundancy information.

U.S. Pat. No. 5,146,588 issued to Michael R. Crater, et al., discloses further performance enhancements to a storage subsystem similar to that described by Milligan, et al. Crater, et al., teaches a method for avoiding time-consuming reset sequences for a redundancy generator circuit such as may be utilized in the data storage subsystem of the present invention.

STATEMENT OF THE PROBLEM

It is a problem in the field of computer systems to provide an inexpensive, high performance, high reliability data storage subsystem. One alternative to the traditional large form factor disk drives for storing data is the use of a plurality of small form factor disk drives interconnected in an array. The plurality of small disk drives are arranged into one or more redundancy groups. Each redundancy group consists of N+M disk drives. Each redundancy group comprises a number of logical tracks equal to the number of physical tracks in any one disk drive of the redundancy group. Each logical track comprises one physical track from each of the disk drives that comprise the redundancy group. Within one logical track, N physical tracks are used to store N data segments and M physical tracks are used to store M redundancy segments. The use of redundancy data in a logical track allows data to be reconstructed if a limited number of disk drives fail.

In such a subsystem of interconnected small disk drives, a control unit in the storage subsystem controls an interface to host computer systems for receiving information to be stored in the subsystem and for returning retrieved information previously stored in the subsystem. The control unit contains a cache component which is used to temporarily store data to be written to the disk drives. The control unit applies data received from host computer systems to the cache component. In addition, the control unit generates control and mapping data and applies the generated data to the cache component. The cache component temporarily stores the applied data until the control unit directs the cache component to write the saved data to logical tracks of the redundancy groups. The cache component also contains a subcomponent for generating and temporarily storing redundancy information. Typically the redundancy information segments are accumulated as data segments are written from cache to the logical tracks of the disk array. After the data segments are written to the disk array, the accumulated redundancy segments are also written to logical tracks of the disk array.

A pool of backup disk drives in addition to those allocated to redundancy groups provides high reliability at low cost. Each disk drive in the array is designed so that it can detect a failure in its operation. Once a failed disk drive is identified, a backup disk drive from the pool is automatically switched into the array to replace the failed disk drive in a redundancy group. Control circuitry reconstructs the data stored on the failed drive using the remaining $N+M-1$ segments of data and redundancy information in the redundancy group. The reconstructed data is written to the backup disk drive to permit resumption of normal subsystem operation. Methods and apparatus for rapid generation and updating of redundancy information in the storage subsystem are taught by Milligan, et al., and Crater, et al., in the aforementioned United States patents.

A problem may arise in assuring the integrity of the information stored on storage subsystems as described above and as disclosed by Milligan, et al. When writing information to a redundancy group, it is sometimes desirable to force the last information written to a logical track to be a specific value. For example, when applying the teachings of Milligan, et al., the data written to a logical track may include an incrementing serial number to distinguish valid, updated copies of information from earlier invalidated copies of the same information. It is desirable to write this serialization information last so that the logical track is validated only after all associated data and redundancy segments have been written successfully to the disk drives of its redundancy group. The redundancy information that is recorded in the redundancy segments must be calculated to include the serialization information.

The problem arises in that the typical methods described above compute the redundancy information as the data segments are written to the disk drives from temporary cache storage. Applying these methods, the serialization information must be written to disk before the redundancy information so that it is included in the redundancy computations. If the serialization information is written to disk before the redundancy information, then the logical track may appear to be validated by the serialization information though it is invalid because the redundancy information is not yet written to disk. A disk drive failure occurring after the logical track has been erroneously validated and before the redundancy information is written to disk will cause data loss because the redundancy information is not recorded on disk to permit data reconstruction. If the serialization information is written to disk after the redundancy information, then the redundancy information on disk is incorrect in that it has not been computed to include the serialization information written to disk after the redundancy information. As described above, a disk drive failure occurring while redundancy information recorded on disk is incorrect will cause data loss. For simple redundancy algorithms it may be possible to modify the data segments so that the generated redundancy information contains the needed serialization information which is then written to disk last. Determining these modifications and applying them to disk writing operations can become impractical for a complicated redundancy formula.

SOLUTION TO THE PROBLEM

The present invention comprises a method of utilizing the data storage subsystem apparatus disclosed by Milligan, et al., and Crater, et al., to eliminate the problem of compromised data integrity described above.

The apparatus for redundancy generation disclosed by Milligan, et al., and Crater, et al. is associated with control logic that controllably applies data temporarily stored in cache memory to the disk drive array. In addition, the control logic controllably applies data from the cache memory to the redundancy generator which accumulates and temporarily stores redundancy information. Data segments stored in cache memory are comprised of data received from host computer systems and information generated by the control unit of the storage subsystem. In addition, the control logic can apply accumulated redundancy information temporarily saved within the redundancy generator to the disk drive array. The control logic controls the cache component to accumulate redundancy information while data stored in cache memory is applied to the disk drive array. In the alternative, the control logic controls the cache component to accumulate redundancy information for data stored in the cache memory without applying the data to the disk drive array. Furthermore, the control logic causes the redundancy information accumulated and saved within the redundancy generator to be written to the disk drives.

The method of the present invention comprises enabling and disabling the writing to disk of portions of data segments while the data segments in cache memory are applied to the redundancy generator. A first portion of data segments of a logical track in cache memory is applied to the redundancy generator to accumulate redundancy information and is simultaneously applied to the disk drives for writing. The last portion of the data segments of a logical track stored in cache memory contains the serialization information. This last portion is next applied to the redundancy generator but is not applied to the disk drives for writing. The redundancy segment information is thus computed correctly for all information in the data segments of the logical track including the serialization information but the serialization information is not yet written to the disk drives. Next, the redundancy information is written to the disk drives. Finally, after all of the first portions of the data segments are written to the disk drives and all the redundancy segments are computed and written to the disk drives, the last portion of the data segments containing the serialization information is written to the disk drives. The redundancy information does not need to be updated because it was already accumulated for all portions of the data segments of the logical track.

This method assures integrity of the data written to the disk drive array without adding complex computations to adjust the information written to the disk drive array. Avoiding the complex calculations necessary to manipulate the data segments to cause the serialization information to appear on the disk drives as part of the redundancy segments prevents potential performance loss. Writing the serialization information last eliminates any potential compromise of data integrity caused by a disk drive failure while a logical track is incorrectly validated on disk before the redundancy information is written to disk.

DETAILED DESCRIPTION OF THE DRAWINGS

Context and Overview

Figure 1:
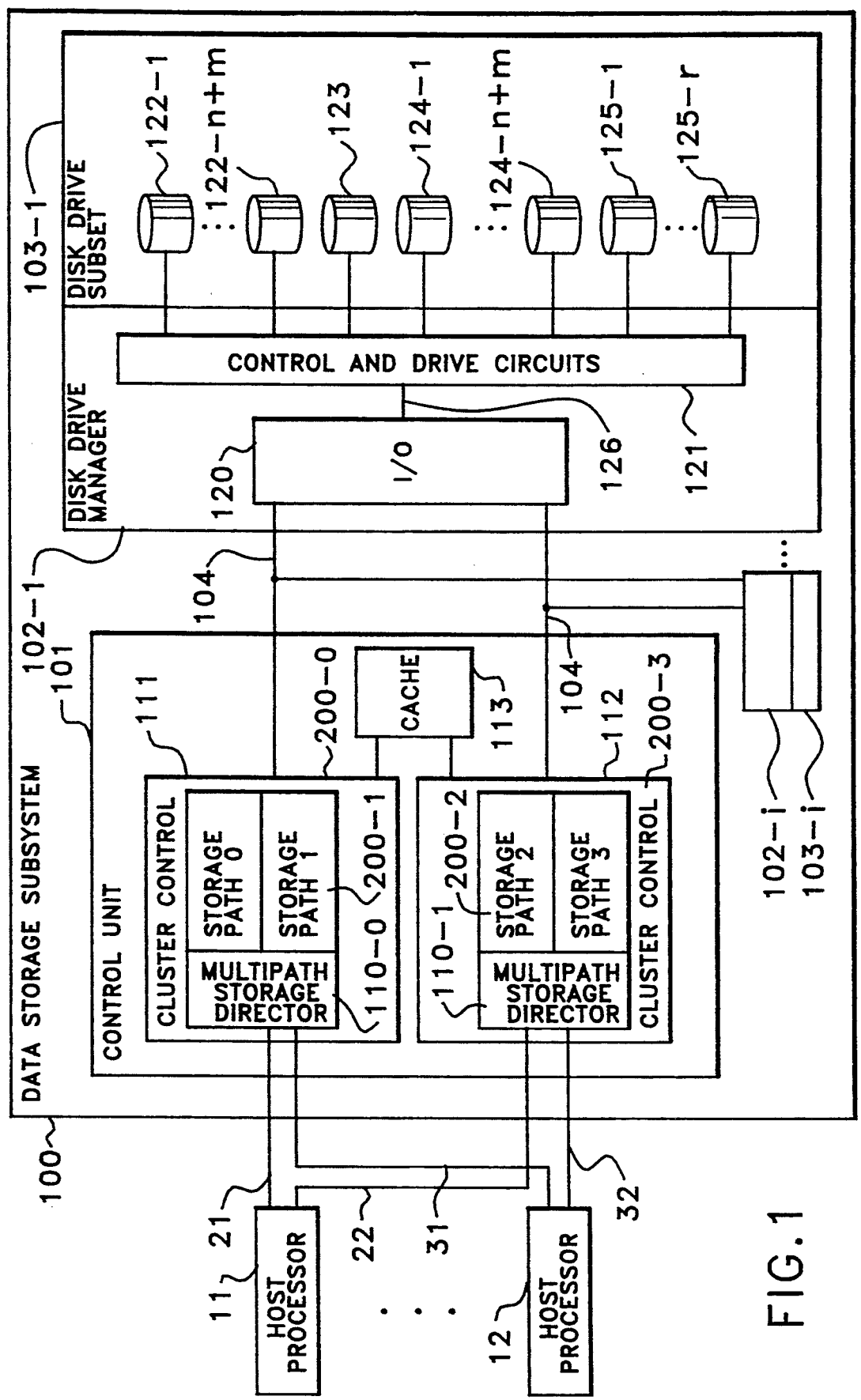
FIG. 1 is a block diagram of the architecture of an exemplary preferred embodiment of a data storage subsystem that may advantageously apply the method of the present invention.

FIG. 1 represents a data storage subsystem which may advantageously embody the method of the present invention. Such a subsystem uses a plurality of small form factor disk drives 122-1 through 125-r to implement an inexpensive, high performance, high reliability disk drive memory that emulates the format and capacity of large form factor disk drives. FIG. 1 depicts a block diagram of such a data storage subsystem 100 connected to a multitude of host computer systems 11 through 12 via a plurality of data channels 21 through 32. Disk drives 122-1 through 125-r of disk drive subset 103-1 are logically subdivided into groups of N+M drives called redundancy groups 122-1 through 122-n+m and 124-1 through 124-n+m. Remaining disk drives 123 and 125-1 through 125-r are spare disk drives available to replace a failing disk drive currently in use in a redundancy group. The N+M disk drives in a redundancy group are used to store N data segments and M redundancy segments which comprise one of the logical tracks of the redundancy group. This logical subdivision of disk drive subset 103-1 is a function of control unit 101 of data storage subsystem 100.

The lowest level of electronic control and interfacing to the disk drive subset 103-1 is performed by disk drive manager 102-1. I/O circuits 120 of disk drive manager 102-1 apply and receive signals over bus 126 to and from control and drive circuits 121. This level of disk drive control and interfacing is known to the art.

Control unit 101 applies data previously stored within cache 113 to disk drive manager 102-1 over fiber channel 104. Control unit 101 also applies redundancy information generated and stored within cache 113 to disk drive manager 102-1 over fiber channel 104.

FIG. 1 depicts significant duplication of devices within data storage subsystem 100. This duplication allows improved performance by overlapping concurrent operations. The duplication also provides for additional subsystem reliability by permitting automatic replacement of a failed device with a spare duplicate device. For example, control unit 101 is comprised of two identical cluster control units 111 and 112. Disk drive manager 102-1 and disk drive subset 103-1 are duplicated i times as elements 102-i and 103-i respectively. This level of redundancy is well understood in the computer industry and is disclosed in additional detail in the Milligan patent. For purposes of this patent, there need be no further discussion of this detailed redundancy. Only one of the several redundant data paths in data storage subsystem 100 will be discussed below.

Data transmitted by host computer system 11 to be stored in the data storage subsystem 100 is applied to cache 113 through cluster control 111. This data is stored in memory within cache 113. At a later time, control unit 101 controls cache 113 and cluster control 111 to retrieve data stored in cache 113 and apply it to fiber channel 104. Disk drive manager 102-1 applies data present on fiber channel 104 to disk drive subset 103-1 through I/O circuits 120, bus 126 and control and drive circuits 121. Further details of the method of the present invention for writing information to disk are described below with reference to FIGS. 3 and 4.

Figure 2:
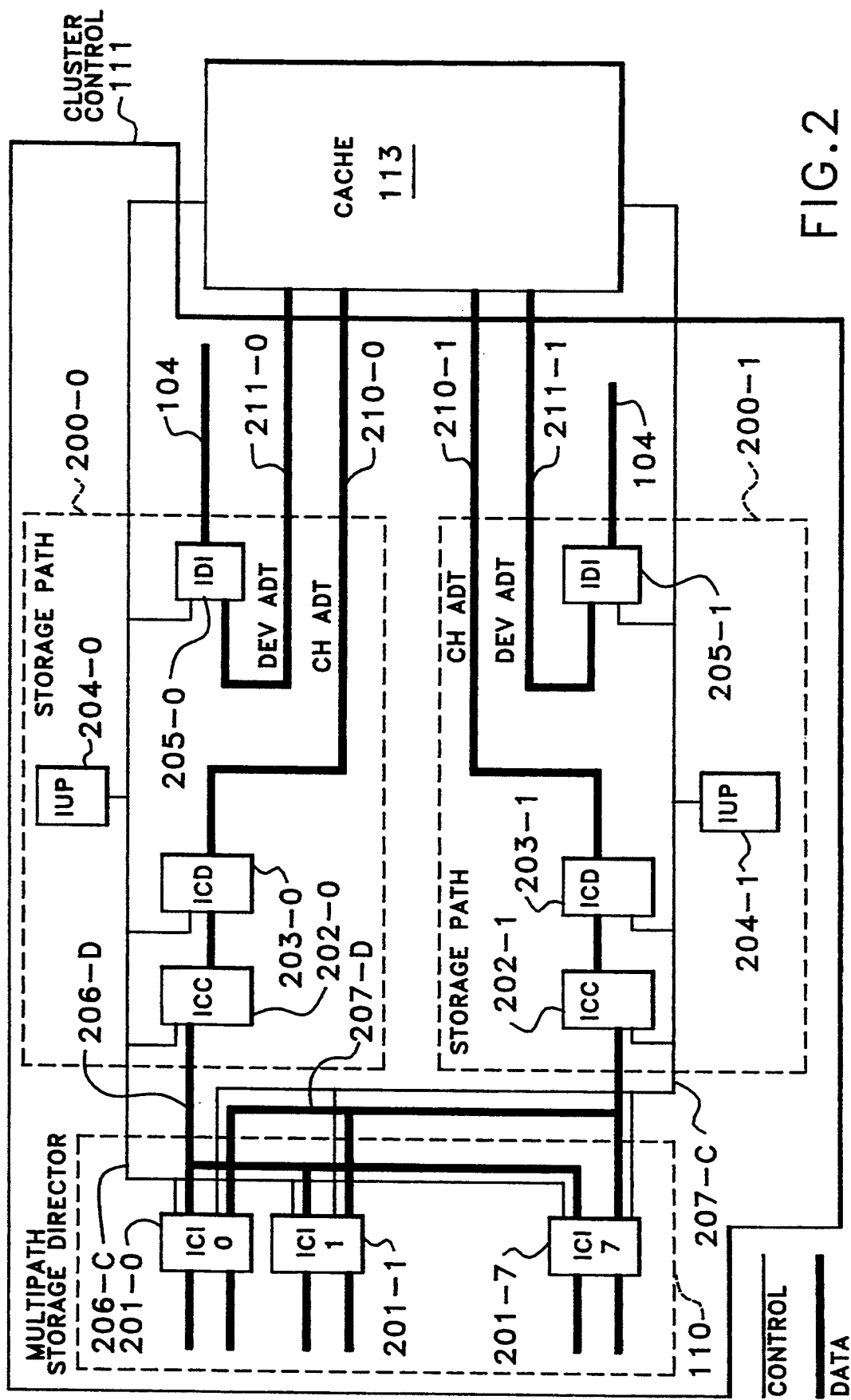
FIG. 2 depicts additional detail of the Control Unit of FIG. 1.

FIG. 2 shows additional detail of cluster control 111. Multipath storage director 110 includes a plurality of channel interface units 201-0 through 201-7 each of which terminates a corresponding pair of data channels (21 and 31 of FIG. 1). The control and data signals received by the corresponding channel interface unit 201-0 are output on either of the corresponding control and data buses 206-C and 206-D or 207-C and 207-D, respectively, to either storage path 200-0 or storage path 200-1. As can be seen from the structure of cluster control 111 of FIG. 2, there is a significant amount of symmetry contained therein. Storage path 200-0 is identical to storage path 200-1 and only one of these is described herein. As noted earlier, the duplication of these electronic paths and devices permits performance enhancements as well as reliability enhancements. Such enhancements are known in the industry.

Channel interface control 202-0 and channel interface decompression 203-0 further manipulate the data and control signals received on control bus 206-C and channel data bus 206-D. Control processor 204-0 applies and receives signals on control bus 206-C to further route information through storage path 200-0. Optical device interface 205-0 converts signals between optical fiber signalling methods applied on fiber channel 104 and the electrical signalling methods applied on metallic conductor data paths 211-0 within storage path 200-0. Data flows in both directions between channel interface decompression 203-0 and cache 113 over the internal channel automatic data transfer bus 210-0 (hereafter channel ADT bus). Data flows in both directions between optical device interface 205-0 and cache 113 over the internal device automatic data transfer bus 211-0 (hereafter device ADT bus). Details of the channel interfacing methods and devices are known in the industry and further detailed in the Milligan, et al. patent.

Redundancy Generation and Write Sequencing

Figure 3:
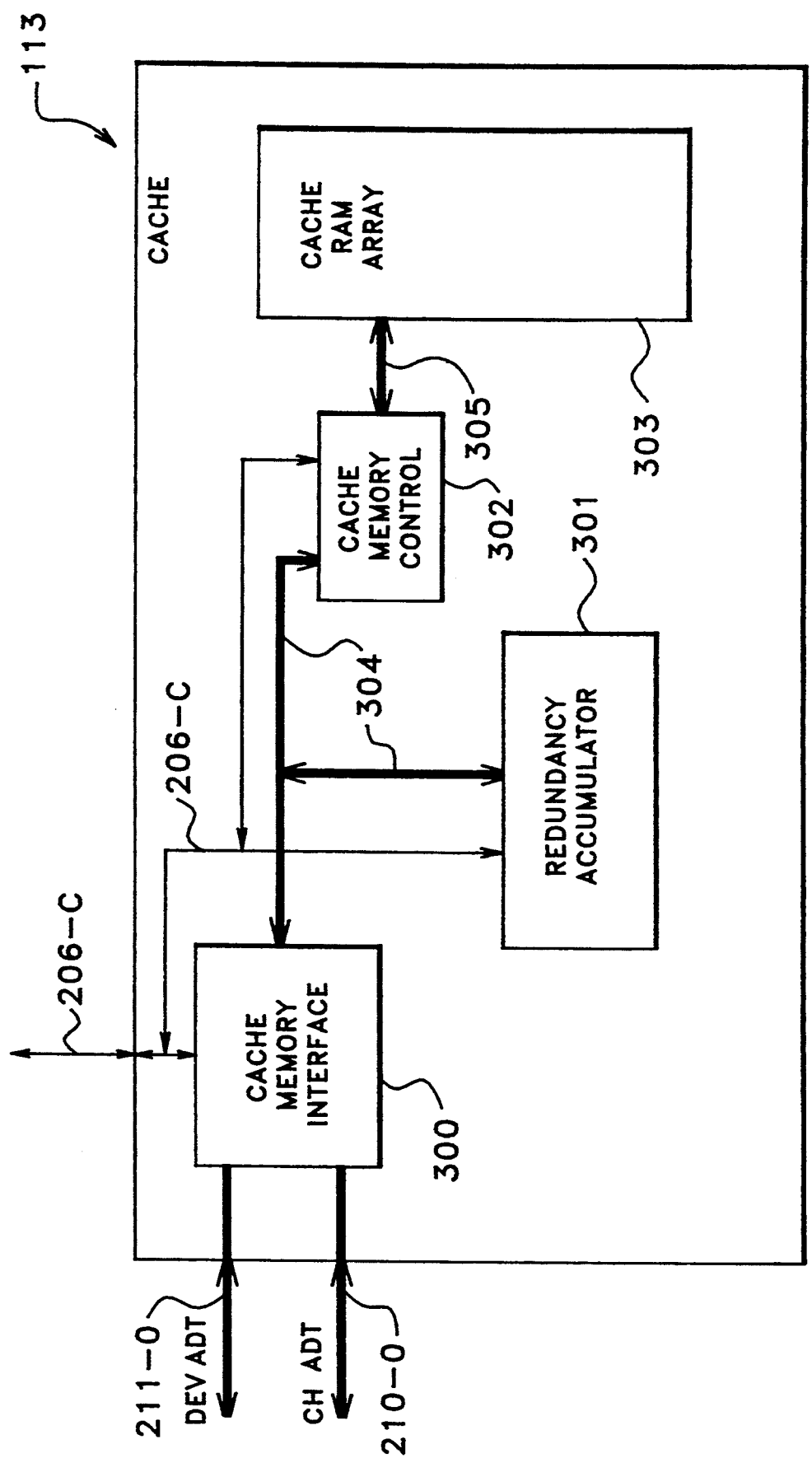
FIG. 3 shows additional detail of the Cache of FIGS. 1 and 2.

FIG. 3 depicts in block form additional details of cache 113 shown in FIG. 1. Cache 113 of FIG. 3 serves three purposes. First, cache 113 serves as a buffer memory for saving information recently accessed from the small disk drives in cache RAM array 303 to speed subsequent accesses. Second, cache 113 serves as a buffer to permit the data transmission speeds between control unit 101 and host computer system 11 to be different than the speed of data transmission between control unit 101 and disk drive subset 103-1. Third, cache 113 performs the function of generating redundancy information as data stored in the cache RAM array 303 is transferred to the disk drives. The redundancy generation aspects of cache 113 are disclosed in U.S. Pat. No. 5,146,588.

FIG. 3 in the Crater patent depicts a block diagram of cache 113 similar to that of FIG. 3 of the present invention but discloses more of the duplication of devices and paths. As noted earlier, this duplication permits enhanced performance and reliability of the data storage subsystem and is well known in the art. Cache memory interface 300 of FIG. 3 of the present invention is the same as each of the duplicate CMI units of FIG. 3 of the Crater patent. Cache memory array 303 of FIG. 3 of the present invention corresponds to the CVM and CNV devices of FIG. 3 of the Crater patent. Redundancy accumulator 301 and cache memory control 302 of the present invention together are within each of the two identical CMC devices of FIG. 3 of the Crater patent.

Control processor 204-0 of FIG. 2 controls the operation of components within cache 113 of FIG. 3 by applying and sensing signals on control bus 206-C. To write data stored in cache RAM array 303 onto disk drive subset 103-1 of FIG. 1, control processor 204-0 causes data in cache RAM array 303 to be applied to bus 305, through cache memory control 302, onto internal cache bus 304 and then through cache memory interface 300 onto device ADT bus 211-0. While data is being copied out of cache RAM array 303, redundancy accumulator 301 senses the data on internal cache bus 304 to accumulate and store redundancy information.

Control processor 204-0 additionally controls cache memory interface 300 such that the application of data on internal cache bus 304 to device ADT bus 211-0 is disabled. When disabled, data is no longer written to disk drive subset 103-1. In this disabled state, redundancy accumulator 301 still accumulates and stores redundancy information for the data it senses on internal cache bus 304. This capability permits redundancy accumulation of data read from cache RAM array 303 without writing the data onto disk drive subset 103-1.

Control processor 204-0 also controls cache 113 such that redundancy information accumulated and stored within redundancy accumulator 301 is applied to device ADT bus 211-0 to be written to disk drive subset 103-1. In this case, information in redundancy accumulator 301 is applied to internal cache bus 304, through cache memory interface 300 and then onto device ADT bus 211-0. The redundancy information on device ADT bus 211-0 is then applied to disk drive subset 103-1 as described earlier. This feature is used to write accumulated redundancy information onto disk drive subset 103-1.

Figure 4:
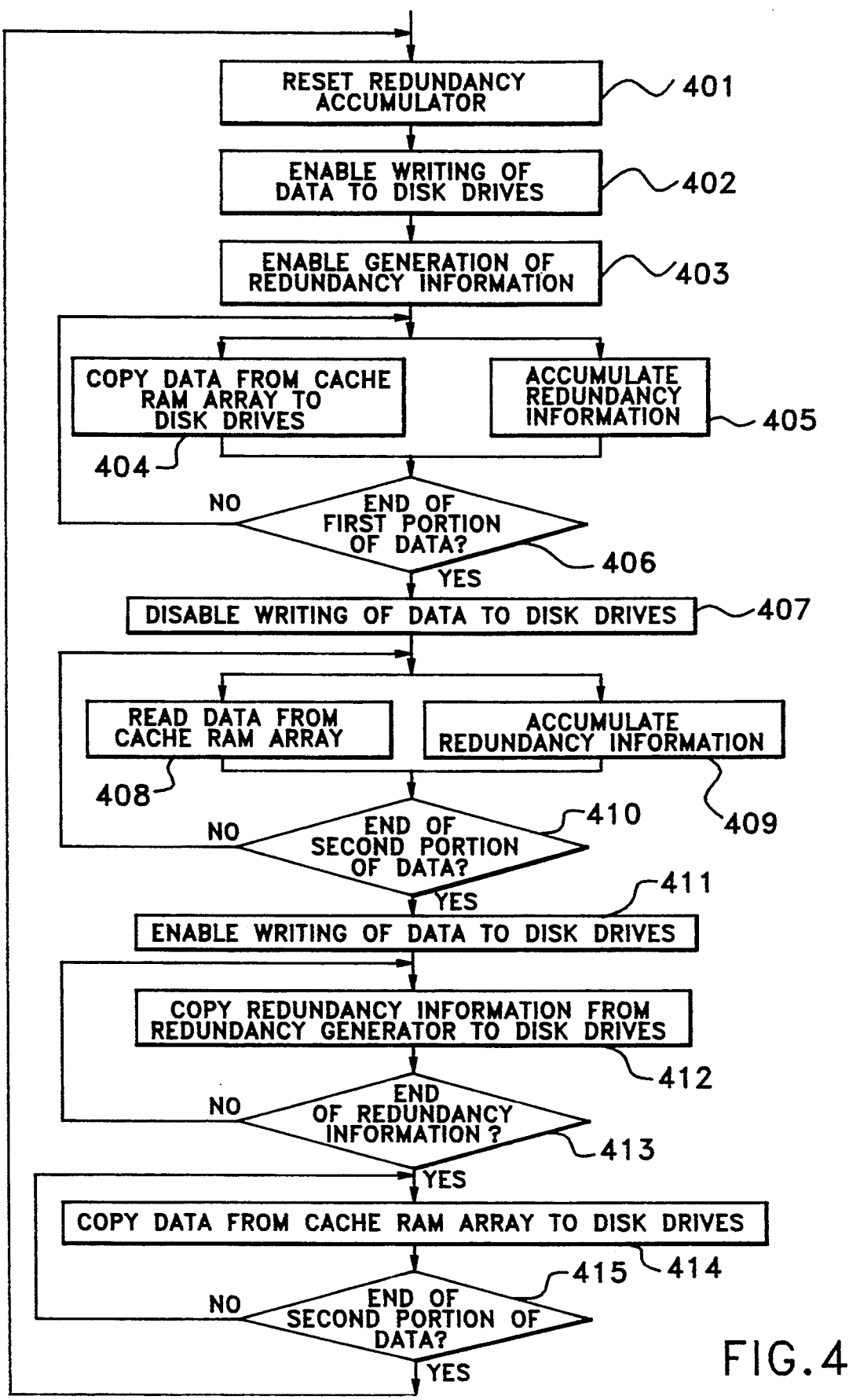
FIG. 4 is a flowchart representing the elements of the method of the present invention for writing information to redundancy groups.

FIG. 4 depicts the elements for writing the information stored in one logical track to the disk drives using the method of the present invention. The information for the logical track is presumed to be previously recorded in cache 113 and saved in cache RAM array 303. In the description of the operations being performed for FIG. 4, reference will be made to the control and functions of the components shown in FIG. 3. It should be recalled that components in FIG. 3 are controlled by control processor 204-0 of FIG. 2 by applying and receiving signals over control bus 206-C. It is assumed in the description below that the compressed form of the data externally generated by the host computer system 11 of FIG. 1 and the control and mapping information and the serialization information that will be contained in the data segments of the logical track have already been stored in the cache RAM array 303.

Element 401 initializes redundancy accumulator 301 of FIG. 3 to prepare for the calculation of the information of the redundancy segments for the logical track to be written to disk. The method and apparatus disclosed by Crater may be advantageously utilized at this step to enhance performance of resetting redundancy accumulator 301.

Element 402 enables data on internal cache bus 304 to be applied to device ADT bus 211-0.

Element 403 enables redundancy accumulator 301 to generate redundancy information for data sensed on internal cache bus 304.

Elements 404 and 405 are performed repeatedly for each piece of information contained in the compressed data, control and mapping information section of the logical track data previously stored in cache RAM array 303. This step excludes the portions of the logical track which comprise the serialization information to be written to disk last. Element 404 causes each piece of information to be applied to device ADT bus 211-0 through cache memory interface 300 over internal cache bus 304, cache memory control 302 and bus 305. Each piece of data applied to device ADT bus 211-0 is then written to disk drive subset 103-1 of FIG. 1 by disk drive manager 102-1. Simultaneously, in element 405 each unit of data being applied to internal cache bus 304 is used by redundancy accumulator 301 to generate redundancy information. Element 406 tests whether or not to repeat elements 404 and 405. Elements 404 and 405 are allowed to continue until all of the compressed data, control and mapping information portion of the logical track have been written to the disk drives.

Element 407 disables cache memory interface 300 from applying data on internal cache bus 304 to device ADT bus 211-0. This is in preparation of the final calculations of the redundancy segment information using the serialization information of the logical track. The serialization information has not yet been written to disk.

Elements 408 and 409 are performed repeatedly for each piece of data in the serialization information portion of the logical track. In element 408 the serialization information stored in cache memory 303 is applied to cache memory control 302 over bus 305. The data is then applied by cache memory control 302 to internal cache bus 304. Cache memory interface 300 is disabled from applying data to device ADT bus 211-0 at this time. Simultaneously, in element 409 each unit of data being applied to internal cache bus 304 is used by the redundancy accumulator 301 to generate redundancy information. Element 410 causes repetition of steps 408 and 409 until all pieces of the serialization information have been processed.

Element 411 enables data on internal cache bus 304 to be applied to device ADT bus 211-0.

Element 412 is performed repeatedly to write the pieces of redundancy information that has been accumulated by redundancy accumulator 301 to the disk drives. Redundancy accumulator 301 is controlled to apply the completed information to internal cache bus 304. Cache memory interface 300 applies the data on internal cache bus 304 to device ADT bus 211-0. Each piece of data applied to device ADT bus 211-0 is then written to disk drive subset 103-1 of FIG. 1 by disk drive manager 102-1. Element 413 causes the repetition of element 412 until all redundancy information has been written to the disk drives.

Elements 414 and 415 write the final portion of the data (the serialization information) to the disk drives. Element 414 writes a piece of the final portion of data stored in cache RAM array 303. Element 415 causes the repetition of step 414 until all of the final portion of the collection of data has been written.

The process defined by the elements 401 through 415 above assures that logical tracks containing validating portions (i.e., serialization information) may be reliably written to the disk drives of a storage subsystem utilizing a plurality of disk drives as disclosed by Milligan, et al. The validation information is the last information written to the logical track following the writing of all other data and redundancy information.

Figure 5:
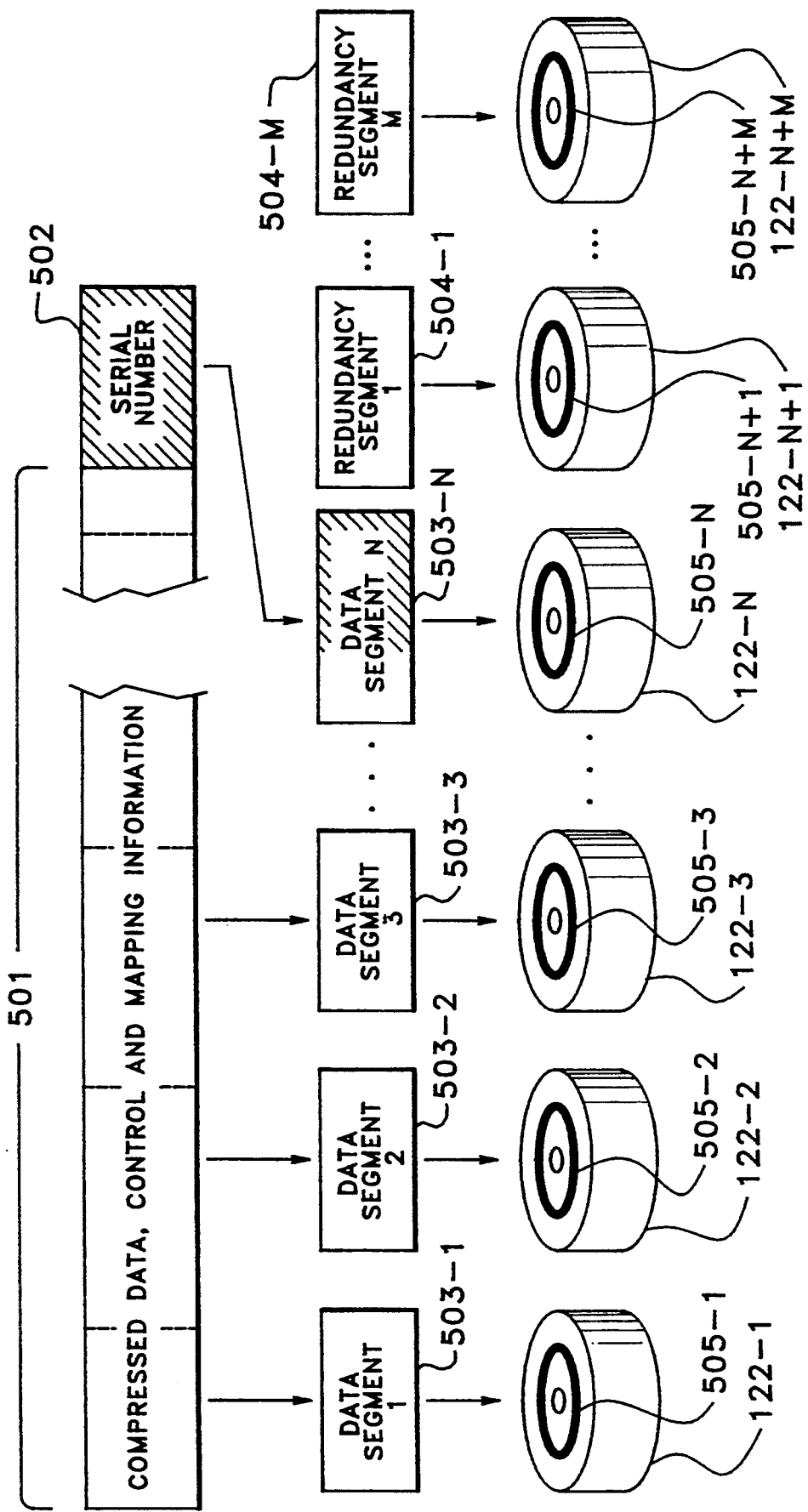
FIG. 5 shows the layout of a logical track as it is written to the disk drives of a redundancy group.

FIG. 5 shows in abstract form the organization of the data content of a logical track. The first portion of the logical track comprises compressed data, control and mapping information 501 which is a collection of the compressed externally generated data from host computer system 11 of FIG. 1 and control and mapping information generated internally by control processor 204-0 of FIG. 2. The second portion of the logical track comprises sequence information 502 which is appended to the compressed data, control and mapping information 501. The remainder of the logical track contains redundancy segments 504-1 through 504-M. The quantity of data making up a logical track is the same as the capacity of the N+M physical tracks 505-1 through 505-N+M of the disk drives of one redundancy group. A logical track is divided into data segments 503-1 through 503-N and redundancy segments 504-1 through 504-M. Each of these segments contains the amount of data which can be stored in a single physical track of one disk drive of the redundancy group. The data segments 503-1 through 503-N are stored on physical tracks 505-1 through 505-N and the redundancy segments 504-1 through 504-M are stored on physical tracks 505-N+1 through 505-N+M. Each of the N+M disk drives 122-1 through 122-n+m which form the redundancy group holds one of the physical tracks 505-1 through 505-N+M. No two of the physical tracks which hold the logical track are on the same physical disk drive.

Though FIGS. 1 through 5 depict computer disk drives as the storage medium, other types of storage devices may be utilized and may advantageously apply the method of the present invention.

While a specific embodiment of this invention has been disclosed, it is expected that those skilled in the art can and will design alternate embodiments of this invention that fall within the scope of the appended claims.

We claim:

1. A method for recording data and associated redundancy information on a data storage subsystem while enhancing reliability and data integrity of said data storage subsystem, said method comprising the steps of:

recording a first portion of said data on said data storage subsystem;

generating said redundancy information for said first portion of said data;

saving a second portion of said data in a memory buffer associated with said data storage subsystem for later recording on said data storage subsystem;

generating said redundancy information for said second portion of said data;

recording said redundancy information on said data storage subsystem to assure integrity of said data recorded on said data storage subsystem; and recording said second portion of said data on said data storage subsystem in response to said recording of said redundancy information and to said recording of said first portion of said data.

2. The method of claim 1 wherein said data storage subsystem further comprises a plurality of redundant, interconnected disk drives for recording said data and said redundancy information.

3. The method of claim 2 wherein said disk drives are logically divided into redundancy groups of N+M drives for storing said data and redundancy information, wherein said data is recorded on N of said N+M disk drives, and wherein said redundancy information is recorded on M of said N+M disk drives.

4. A method for recording data and associated redundancy information on a data storage subsystem while enhancing reliability and data integrity of said data storage subsystem, wherein said data further comprises a first portion and a second portion, wherein recording of said second portion validates successful recording of said first portion and said redundancy information, wherein said data storage subsystem comprises a plurality of redundant, interconnected storage devices, and wherein said data storage subsystem comprises memory means for saving portions of said data, said method comprising the steps of:

recording said first portion of said data on a portion of said storage devices;

accumulating redundancy information for said first portion of said data;

saving said second portion of said data in said memory means;

accumulating redundancy information for said second portion of said data;

recording said redundancy information on a portion of said storage devices; and recording said saved second portion of said data on a portion of said storage devices in response to recording of said first portion of said data and in response to recording of said redundancy information.

5. The method of claim 4 wherein said storage devices comprise disk drives.

6. The method of claim 4 wherein said storage devices are logically divided into redundancy groups of N+M storage devices for storing said data and redundancy information, wherein said data is recorded on N of said N+M storage devices, and wherein said redundancy information is recorded on M of said N+M storage devices.

7. The method of claim 6 wherein said storage devices comprise disk drives.

8. The method of claim 6 wherein said data storage subsystem updates said information on said N+M storage devices by:

writing updated said information onto unused physical locations of said N+M storage devices, validating said updated information on said N+M storage devices, and invalidating earlier versions of said updated information on said N+M storage devices making associated physical locations of said N+M storage devices unused.

9. The method of claim 8 wherein said storage devices comprise disk drives.

10. The method of claim 4 wherein said data storage subsystem further comprises:

host interface means for communicating between host computer systems and said data storage subsystem, said interface means being adapted to communicate host computer requests to store Said data on or retrieve said data from said data storage subsystem and to communicate data supplied by said host computer to be stored in said data storage subsystem and to communicate data retrieved from said data storage subsystem back to said host computer;

control means for servicing said host computer requests to store data in said data storage subsystem or to retrieve data from said data storage subsystem;

means for recording and retrieving said data on said storage devices;

means for recording and retrieving said redundancy information on said storage devices; and redundancy generation means for accumulating and temporarily storing redundancy information associated with said data, said redundancy information being generated so that missing or erroneous information stored on said storage devices may be reconstructed in case of failure of one or more of said storage devices.

11. The method of claim 10 wherein said storage devices comprise disk drives.

12. The method of claim 10 wherein said data further comprises:

external data received from said host computer systems or transmitted to said host computer systems, and control and mapping data generated by said control means and associated with said external data on said storage devices.

13. The method of claim 12 wherein said storage devices comprise disk drives.

* * * * *